United States Patent
Chen et al.

Patent Number: 6,100,984
Date of Patent: Aug. 8, 2000

[54] SURFACE MEASUREMENT SYSTEM WITH A LASER LIGHT GENERATOR

[76] Inventors: Fang Chen, 364 Daylily Dr., Rochester Hills, Mich. 48307; Mumin Song, 4976 S. Ridgeside Cir., Ann Arbor, Mich. 48105; Patrick J. Harwood, 24635 Powers Rd., Farmington Hills, Mich. 48336; Christopher Thomas Griffen, Islandview Condominiums 2445 Riverside, Unit 200, Trenton, Mich. 48183

[21] Appl. No.: 09/330,916

[22] Filed: Jun. 11, 1999

[51] Int. Cl.$^7$ ................................................ G01B 11/24
[52] U.S. Cl. ................................ 356/376; 250/559.22
[58] Field of Search ................................ 356/376, 375, 356/379, 394, 374; 250/237 G, 559.19, 559.22; 353/20, 28, 97, 98, 102

[56] References Cited

U.S. PATENT DOCUMENTS

| | | |
|---|---|---|
| 4,906,099 | 3/1990 | Casasent . |
| 5,175,601 | 12/1992 | Fitts ........................................... 356/376 |
| 5,319,445 | 6/1994 | Fitts ........................................... 356/376 |
| 5,450,204 | 9/1995 | Shigeyama et al. ..................... 356/394 |
| 5,471,308 | 11/1995 | Zeien ........................................ 356/376 |
| 5,581,352 | 12/1996 | Zeien ........................................ 356/376 |
| 5,589,942 | 12/1996 | Gordon ..................................... 356/376 |
| 5,691,784 | 11/1997 | Hausler et al. .......................... 356/376 |
| 5,825,482 | 10/1998 | Nikoonahad . |

*Primary Examiner*—Hoa Q. Pham

[57] ABSTRACT

A measurement system (10) for accurately measuring the surface geometry of a part in three dimensions includes a laser (22) for emitting a laser beam (20). An objective lens (18) receives the laser beam (20) and expands the received laser beam (20) into a diverged beam. A liquid crystal system (16) is disposed in front of the objective lens (18) with respect to the laser (22) for receiving the diverged beam. The liquid crystal system (16) receives the diverged beam and generates at least one fringe pattern (24) on a surface of a three dimensional part which is to be measured. A computer (12) is in communication with the liquid crystal system (16) to control the pitch and phase of the fringe pattern (24).

17 Claims, 1 Drawing Sheet

SURFACE MEASUREMENT SYSTEM WITH A LASER LIGHT GENERATOR

TECHNICAL FIELD

The present invention relates generally to an optical three-dimensional measurement system. More particularly, the present invention relates to a non-contact optical three dimensional measurement system using a laser structured light generator.

BACKGROUND ART

Many current systems exist for measuring the geometry of three-dimensional surfaces. One such system is a coordinate measurement system (CMM) that is used to measure die stamps, stamped panels, and other vehicle body structures.

The current CMM systems suffer from a variety of disadvantages. First, the CMM systems are slow which limits the number of measurements that can be taken during any given period of time. Second, the CMM systems require surface contact in order to function properly and therefore may damage the surface of the part. The CMM systems are thus typically only used in connection with small-scale projects, which makes them relatively inefficient.

Additionally, current measurement surfaces typically have a variety of mechanically moving parts. These moving parts can cause vibrations in the system, which can affect the accuracy of the measurements. In order to reduce to inaccuracy or unreliability in the measurements of the systems that utilize mechanically moving parts, the system has to allow time for the vibration to settle before the measurements are taken. This, however, adds to the time of the process and therefore increases the cost. These systems also have limitations in data acquisition speed, size, and reliability.

It would therefore be advantageous to have a measurement system for accurately and reliably measuring the surface geometry of parts in three dimensions that is less expensive and more accurate than prior systems.

SUMMARY OF THE INVENTION

It is therefore an object of the present invention to provide a non-contact optical based three dimensional measurement system that is both light in weight and accurate.

It is another object of the present invention to provide a non-contact optical based three dimensional measurement system that has high data acquisition speeds.

It is a further object of the present invention to provide a three dimensional measurement system that will decrease the cost of die development and vehicle body design.

It is still a further object of the present invention to provide a three dimensional measurement system that is insensitive to environmental vibration.

In accordance with the objects of the present invention, a measurement system for measuring the surface geometry of parts in three dimensions is provided. The measurement system includes a laser for emitting a laser beam. The laser beam is first passed through a lens which diverges the beam. The lens is positioned in close proximity to a liquid crystal system such that the diverged beam passes from the lens to the liquid crystal system. The liquid crystal system utilizes the diverged beam and generates a fringe pattern on a surface whose shape is to be measured in three dimensions. The liquid crystal system is in communication with a computer which controls the pitch of the fringe pattern on the part surface. A camera or other photographic equipment is positioned to take an image of the fringe pattern on the surface. Thereafter, the computer and the liquid crystal system performs a phase shifting technique and then takes another picture of another image.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
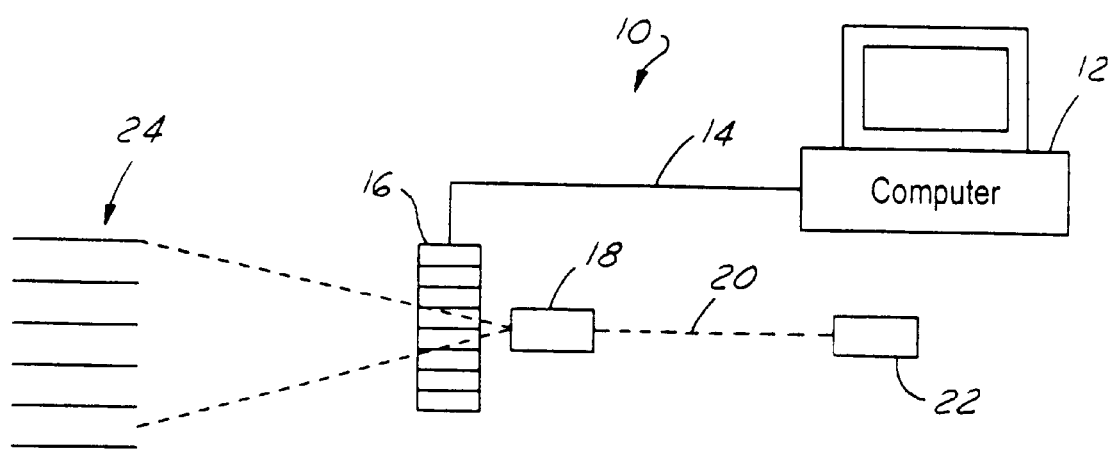
FIG. 1 is a schematic illustration of a laser structure light generator in accordance with a preferred embodiment of the present invention.

Turning now to FIG. 1, which illustrates a preferred measurement system 10, in accordance with the present invention. The measurement system 10 is a non-contact optical three-dimensional measurement system for measuring the three dimensional geometry of various surfaces, including dies, stamping panels, and vehicle body structures. The preferred measurement system is intended to be faster and more accurate than current surface measurement systems.

The system 10 includes a computer 12 that is in electrical communication via a signal 14 with a liquid crystal system 16. The liquid crystal system 16 is preferably a spatial light modulator (SLM), however a variety of other liquid crystal systems may be utilized. An objective lens 18 is positioned behind, and in close proximity to the liquid crystal system such that a laser beam 20 emitted from a laser 22 located rearwardly of the objective lens 18 passes through both the liquid crystal system 16 and the lens 18. The lens preferably has a very short focus length, such as that found on an objective lens for a microscope. The optical set up of the liquid crystal system 16 and the objective lens 18 is compact and thus relatively insensitive to environmental vibration. Because of the compact nature of the optical set, the system is light and can therefore be mounted on a robot or a stand.

In operation, the laser beam 20 passes through the objective lens 18 and expands the laser beam 20 into a diverged beam. The diverged beam then passes through the liquid crystal system 16 and generates a line array or fringe pattern on the surface of the part to be measured, as generally represented by reference number 24. In a preferred embodiment, the pixel size on the surface is 3 micrometers by 3 micrometers. However, a variety of other sizes may be employed. The computer 12 controls the pitch and phase of the fringe pattern as required.

After the fringe pattern is projected onto the part surface, an image is formed that includes the fringe pattern and the part surface which is being measured. The image formation on the part surface 24 preferably employs diffraction effect, as is well known in the art, so that the fringe pattern exists in space and effectively eliminates any defocus problem. Other known image formation techniques may be utilized. Multiple fringe patterns are preferably formed on the surface of the part 24 to be measured. In the preferred embodiment, three fringe patterns are generated on the part surface in order to ensure accurate measurement of the part surface geometry. However it should be understood that four or more patterns may be generated.

After the first image has been formed, a camera or other photographic device (not shown) takes a picture of the image (comprised of the fringe pattern on the part surface). Thereafter, the computer 12 signals the liquid crystal system 16 in order to phase shift the fringe pattern, as is well known in the art. The phase shifting assists in the accurate measurement of the part surface 24. Thereafter, another photograph is taken of this subsequent image resulting from the phase shift. Phase shifting is then preferably performed again in order to generate a third image. A photograph is then taken of this third image. This process is preferably performed three times. However, it may be performed more or less times in accordance with the present invention.

While particular embodiments of the invention have been shown and described, numerous variations and alternate embodiments will occur to those skilled in the art. Accordingly, it is intended that the invention be limited only in terms of the appended claims.

What is claimed is:

1. A measurement system for accurately measuring the surface geometry of a part in three dimensions, comprising:
    a laser for emitting a laser beam;
    an objective lens for receiving said laser beam and expanding said laser beam into a diverged beam;
    a liquid crystal system disposed forward of said objective lens with respect to said laser for receiving said diverged beam, said liquid crystal system receiving said diverged beam and generating at least one fringe pattern on a surface of the part to be measured; and
    a computer in communication with said liquid crystal system to control the pitch and phase of said at least one fringe pattern;
    said objective lens has a short focus length and is disposed in close proximity to said liquid crystal system so that the effects of any environmental vibration are minimized.

2. The measurement system as recited in claim 1, wherein said liquid crystal system is a spatial light modulator.

3. The measurement system as recited in claim 2, wherein said objective lens is located in close proximity to said liquid crystal system.

4. The measurement system as recited in claim 3, wherein a plurality of fringe patterns are formed on said surface of said part in order to measure said part surface geometry.

5. The measurement system as recited in claim 4, wherein the part being measured is a vehicle body part.

6. The measurement system as recited in claim 4, wherein the part being measured is a die.

7. A method for measuring a surface geometry of a part comprising the steps of:
    emitting a laser beam from a laser;
    expanding said laser beam into a diverged beam through the use of an objective lens having a short focus length; and
    generating at least one fringe pattern on the part through the use of a liquid crystal system located in front of and in close proximity to said objective lens;
    forming an image on a surface of the part; and
    photographing said image for calculating the surface geometry of the part;
    the configuration of said lens and said liquid crystal system minimizes the effect of any environmental vibration on said calculation of the part surface geometry.

8. The method as recited in claim 7, further comprising:
    phase shifting said fringe pattern to form second image; and
    photographing said second image for calculating the surface geometry of the part.

9. The method as recited in claim 8, wherein said phase shifting is performed at least three times.

10. The method as recited in claim 7, wherein said step of generating at least one fringe pattern is performed by a spatial light modulator.

11. The method as recited in claim 7, wherein said step of generating is controlled by a computer to ensure proper pitch of said fringe pattern.

12. The method as recited in claim 7, wherein said step of forming an image utilizes diffraction effect.

13. A measurement system for accurately measuring the surface geometry of a part, comprising:
    a laser for emitting a laser beam;
    a lens for receiving said laser beam and creating a diverged beam;
    a liquid crystal system disposed forwardly of said lens with respect to said laser for receiving said diverged beam and generating at least one fringe pattern on the surface of the part said lens having a short focus length and being in close proximity to said liquid crystal system in order to minimize the effect of any environmental vibrations; and
    a computer in communication with said liquid crystal system to control the configuration of said at least one fringe pattern.

14. The measurement system of claim 13, wherein said liquid crystal system is a spatial light modulator.

15. The measurement system of claim 14, wherein said lens is an objective lens.

16. The measurement system of claim 15, wherein a plurality of fringe patterns are formed on said surface of said part.

17. The measurement system of claim 16, wherein the surface geometry of the part measured in three dimensions. said at least one fringe pattern to assist in accurately measuring said part surface.

* * * * *